Dec. 15, 1964     L. N. FARLEY     3,161,046
LOAD CELL
Filed June 13, 1961

INVENTOR
L. Nelson Farley

BY

ATTORNEY

United States Patent Office 3,161,046
Patented Dec. 15, 1964

3,161,046
LOAD CELL
Linwood Nelson Farley, Waltham, Mass., assignor to Baldwin-Lima-Hamilton Corporation, a corporation of Pennsylvania
Filed June 13, 1961, Ser. No. 116,845
3 Claims. (Cl. 73—141)

This invention relates to load cells, particularly of the type embodying means that is electrically strain responsive to applied load.

Load cells of this general type preferably, but not necessarily, employ the well-known electrical resistance filament type strain gages bonded to the surface of an element whose strain varies in response to load imposed upon it, such strain arising from at least a small degree of deformation of the element. One end of such a strain sensing element is usually supported upon a relatively fixed base while the other end to which loads are applied is laterally guided by suitable means such as diaphragms or the like. The diaphragms are capable of exerting an axial force in the same direction as the applied load and it has heretofore been attempted to employ this condition for obtaining linearity between the electrical output and the applied load and to minimize hysteresis effects as well as to match the output under tension and compression loads as closely as possible. This has heretofore been difficult to obtain because it has been necessary to try to adjust the initial axial tension of a diaphragm by slipping the sensing element relative to the diaphragm in a press. This involved a trial and error type of adjustment and was expensive and rather uncertain in its effects.

It is an object of my invention to provide improved means for effectively controlling the initial axial force of a stabilizing diaphragm in load cells in order to obtain a high degree of linearity, minimum hysteresis effects, and matching of the output in load cells that are used for both tension and compression loads.

Another object is to provide improved means for accomplishing the foregoing results in a relatively simple and economical manner that can be performed easily and in an expeditious manner with a relatively high degree of accuracy.

Other objects and advantages will be more apparent to those skilled in the art from the following description of the accompanying drawings in which.

Figures 1, 2, 3:
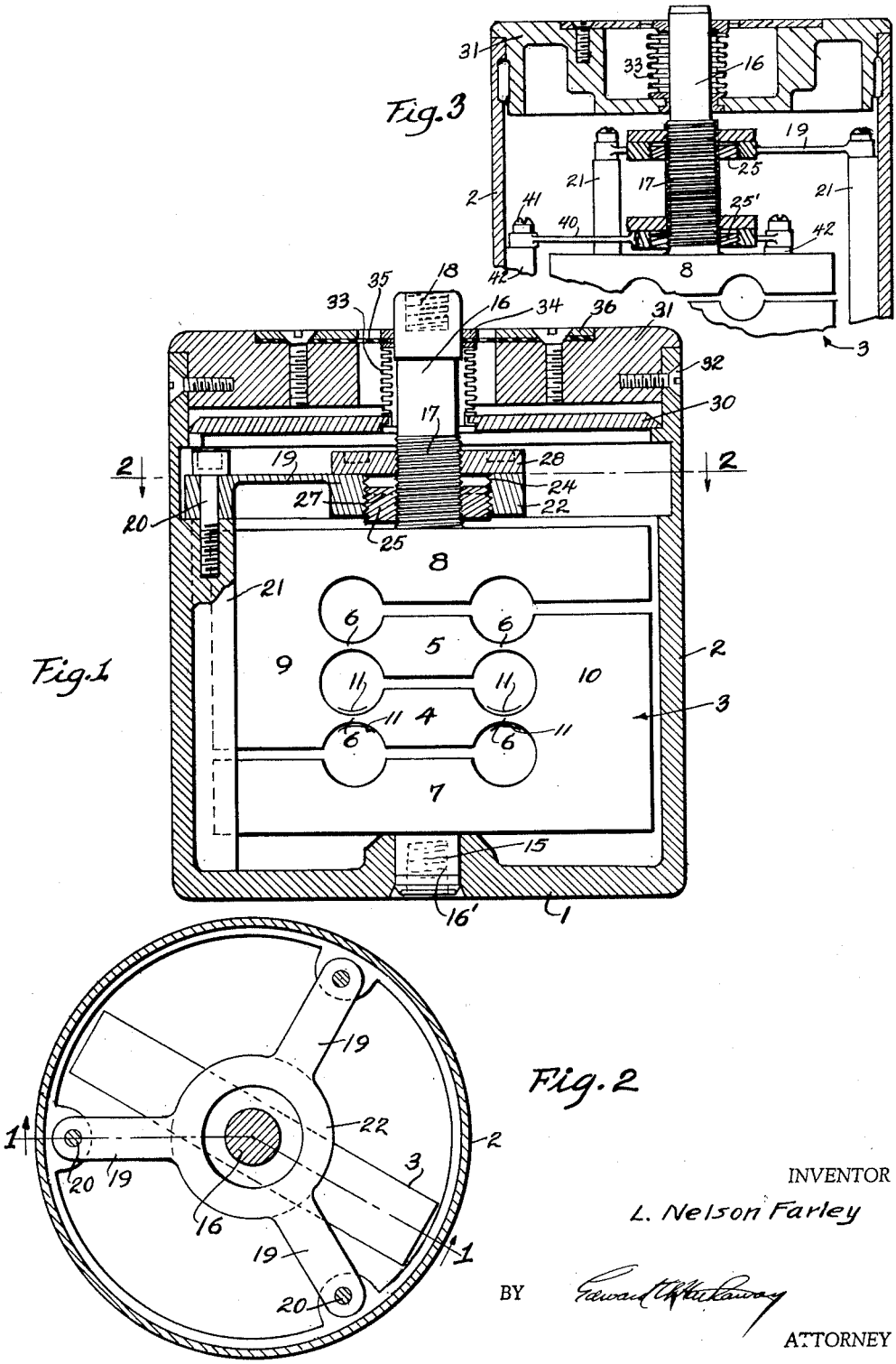
FIG. 1 is a vertical sectional view of a load cell embodying my invention and taken substantially on the line 1—1 of FIG. 2.
FIG. 2 is a horizontal section taken substantially on the line 2—2 of FIG. 1.
FIG. 3 is a sectional view of the upper end of a load cell to show a modified arrangement whereby my invention may resist eccentric loads.

In the particular embodiment of my invention disclosed herein for purposes of illustrating one form, among possible others, that the invention might take in practice, I have provided a housing having a base 1 and an encircling wall 2 preferably cylindrical. Supported on base 1 is a strain-responsive load sensing element generally indicated at 3. This element, as is well known in the art may take any one of various forms such as a ring, a column, a bending beam, etc. but as shown herein the sensing element is preferably of a so-called parallelogram type having a pair of parallel beams 4 and 5 connected by flexure sections such as 6 to relatively heavy inflexible end sections 9 and 10 which in turn are connected to load transmitting portions 7 and 8. Strain gages of the electrical resistance filament type are preferably bonded to the flexure sections as indicated at 11. The sensing element has a lower cylindrical extension 15 press-fitted into the base 1 and may be provided with a threaded opening 16 to receive a tension load bolt if desired. The upper section 8 of the sensing element has a stem 16 whose lower end is externally threaded at 17 and has an internal threaded opening 18 to receive a tension loading rod if desired. Compression loads are measured by applying the same directly to the upper end of stem 16 and to base 1.

To laterally stabilize the sensing element 3 I provide a diaphragm preferably of the spider type having three arms 19, suitably secured at their ends by bolts 20 threaded in suitable bosses 21 of the casing wall 2. The inner end of the arms 19 are connected to a circular ring 32 internally threaded at 24 to match external threads on a nut 25. This nut has internal threads matching threads 17. The threads 17 and 24 are of preferably the same hand but of different pitch such, by way of example, as threads 17 having twenty-five threads per inch and threads 24 having twenty-four threads per inch so that one complete turn of nut 25 will effect a relative axial movement between shaft 16 and the spider diaphragm of 1/600 of an inch. The nut 25 is provided with any suitable wrench or screw driver slots 27 to permit this adjustment which it is seen is sufficiently fine that a high degree of exact control of the axial position of the inner ends of the spider and its consequent axial force on the sensing element 3 may be obtained in either direction. A lock nut 28 may be securely fastened to hold whatever adjustment is finally obtained.

Various means may be employed to close the top of the housing 2 which in the particular embodiment shown consists of a plate 30 supported on suitable shoulders and a top cover 31 held by lateral screws 32. To provide a flexible seal against the entrance of foreign matter into the housing, a bellows 33 may be connected to plate 30 and to a ring 34 fitted around the head of shaft 16, while a rubber diaphragm 35 is held by ring 34 and a suitable annular clamping plate 36.

In FIG. 3 I provide a second spider-type diaphragm 40 similar to 19 but having its arms angularly offset from the other arms so as to be connected as at 41 to short bosses 42 formed on the walls of casing 2. The second spider is connected to an elongation of threaded stem 16 by a differential nut 25' identical to nut 25 in structure and operation. The two nuts would be adjusted to obtain the desired initial axial force on the load responsive means 3 and in addition, their axial spacing insures resistance against eccentric loading.

From the foregoing disclosure it is seen that I am able in a relative simple and yet rugged manner to effectively control the initial position of the lateral stabilizing diaphragm which is especially important in low-capacity load cells. Such initial position will keep the spider (or spiders) in a relatively flat position (or any other predetermined position) so that the spider (or spiders) either (1) does not affect the linearity of the cell, (2) is used to compensate non-linearity, or (3) is used to form some other load output relation which may be desired. The axial adjustment of the spider is thereby adapted to impose an initial axial force (which may be a negative value, or zero, or a positive value) upon the sensing element 3 in order to obtain optimum linearity and minimize hysteresis effects, as well as more closely matching the electrical output under tension and compression loads.

It will, of course, be understood that various changes in details of construction and arrangement of parts may be made by those skilled in the art without departing from the spirit of the invention as set forth in the appended claims.

I claim:
1. A load cell having a strain-sensitive load responsive element to which a load is applied in an axial direction, means for supporting one end of said element, axially flexible means having an outer portion operatively connected to said supporting means and a central portion operatively connected to the other end of the sensitive element for laterally guiding such other end, and differential threaded means interposed between said guided end of the sensitive element and said central portion for effecting a predetermined initial axial position of the flexible means.

2. A load cell comprising, in combination, a strain-sensitive load responsive element that is deformable in an axial direction, electrical strain gages on said sensitive element, means for supporting one end of said sensitive element against axial movement, an axially flexible member for laterally guiding the other end of said sensitive element, said flexible member being connected to said supporting means and having a threaded axial opening, a threaded shaft extending axially from said other end of said sensitive element, and an annular nut threaded on said shaft and on the threads of said opening, the threads in the opening and on the shaft being of different pitch so that rotation of the nut causes relative axial movement between the shaft and flexible member thereby axially deflecting the member so as to impose an initial axial force on the sensitive element and accordingly adjust the initial electrical output of the strain gages.

3. A load cell having a strain-sensitive load responsive element to which load is applied in an axial direction, means for supporting one end of said element, a plurality of axially spaced axially flexible means operatively connected to the other end of said element and to said supporting means for laterally guiding such other end, and differential threaded means threaded on said other end and on said flexible means for adjusting the relative axial positions of the flexible means.

References Cited in the file of this patent

UNITED STATES PATENTS

| | | |
|---|---|---|
| 2,561,318 | Ruge | July 17, 1951 |
| 2,814,946 | Harris | Dec. 3, 1957 |